United States Patent [19]

Buettner

[11] Patent Number: 5,994,670
[45] Date of Patent: Nov. 30, 1999

[54] ELECTRICAL HEATING OF SOILS USING HIGH EFFICIENCY ELECTRODE PATTERNS AND POWER PHASES

[75] Inventor: Harley M. Buettner, Livermore, Calif.

[73] Assignee: The Regents of the University of California, Oakland, Calif.

[21] Appl. No.: 08/819,161

[22] Filed: Mar. 17, 1997

[51] Int. Cl.⁶ .................................................. H05B 1/00
[52] U.S. Cl. .......................................... 219/213; 405/128
[58] Field of Search ................................... 219/213, 201, 219/549, 528, 535; 405/128, 131

[56] References Cited

U.S. PATENT DOCUMENTS

| | | | |
|---|---|---|---|
| 4,670,634 | 6/1987 | Bridges | 219/213 |
| 5,169,263 | 12/1992 | Johnson et al. | 405/128 |
| 5,221,827 | 6/1993 | Marsden | 219/213 |
| 5,233,164 | 8/1993 | Dicks | 219/213 |
| 5,316,411 | 5/1994 | Buelt et al. | 405/128 |
| 5,330,291 | 7/1994 | Heath et al. | 405/128 |

*Primary Examiner*—Tu Ba Hoang
*Assistant Examiner*—Thor Campbell
*Attorney, Agent, or Firm*—L. E. Carnahan

[57] ABSTRACT

Powerline-frequency electrical (joule) heating of soils using a high efficiency electrode configuration and power phase arrangement. The electrode configuration consists of several heating or current injection electrodes around the periphery of a volume of soil to be heated, all electrodes being connected to one phase of a multi-phase or a single-phase power system, and a return or extraction electrode or electrodes located inside the volume to be heated being connected to the remaining phases of the multi-phase power system or to the neutral side of the single-phase power source. This electrode configuration and power phase arrangement can be utilized anywhere where powerline frequency soil heating is applicable and thus has many potential uses including removal of volatile organic compounds such as gasoline and tricholorethylene (TCE) from contaminated areas.

20 Claims, 3 Drawing Sheets

ELECTRICAL HEATING OF SOILS USING HIGH EFFICIENCY ELECTRODE PATTERNS AND POWER PHASES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to electrical heating of soils, particularly to powerline-frequency electrical heating of soils, and more particularly to electrical heating of soils using high efficiency electrode patterns and power phasing wherein only one phase of a power system is connected to the current injection or heating electrodes.

Powerline-frequency (60 Hz) electrical heating of the area surrounding a wellbore and between wellbores has been used for several years in the oil industry to enhance the extraction of heavy oils. Powerline-frequency heating is more cost effective than radio-frequency heating due to the use of conventional equipment. More recently, efforts have been carried out to use electrical heating in conjunction with vacuum extraction as a means of removing volatile organic compounds from the soil. Methods for improving the uniformity of the soil heating distribution have been proposed and can be shown to improve the uniformity, but have the following drawbacks: 1) they involve the design and construction of very specialized and expensive hardware, and 2) they are not efficient and are therefore not cost-effective. Thus, a need exists for a simple, cost-effective and efficient way of uniformly heating the soil by current injection.

This need is satisfied by the present invention which utilizes an arrangement which consists of several heating electrodes around the periphery of a volume of soil to be heated--all connected to one phase of a multi-phase or single-phase power system, and a return electrode or electrodes located inside the volume to be heated connected to the remaining phases (multi-phase) or the neutral side of the power source (single-phase). By this arrangement, the size and shape of the volume of soil to be heated is arbitrary, any number of electrodes can be used on the periphery of the volume, and may be located vertically or horizontally in drilled holes or trenches.

SUMMARY OF THE INVENTION

It is an object of the invention to provide powerline-frequency electrical heating of soils.

A further object of the invention is to provide high-efficiency electrode patterns for electrical heating of soils.

A further object of the invention is to provide an arrangement of soil heating electrodes connected to only one phase of a power system.

Another object of the invention is to provide an arrangement of electrodes for electrical soil heating wherein the heating or injection electrodes are located about a periphery of the soil to be heated and the return electrode or electrodes are located within the periphery, each heating electrode being connected to a single phase of a power system.

Another object of the invention is to provide a method for powerline-frequency electrically heating soil using a plurality of peripherally located heating electrodes and one or more return electrodes within the periphery for use with multi-phase or single-phase power systems.

Other objects and advantages of the present invention will become apparent from the following description and accompanying drawings. The invention involves electrical soil heating. This is done by connecting all electrodes on a periphery of a volume of soil to be heated to a single electrical phase with the return electrode(s) interior to the volume and connected to a different phase or phases. As such, the size and shape of the volume is arbitrary, any number of electrodes can be used on the periphery of the volume, the electrodes can be arbitrarily shaped and placed vertically or horizontally in drilled holes or trenches, the return electrode need not be a single electrode (in fact it is often desirable to replace a single return electrode with several return electrodes), the return electrode(s) may be connected to different electrical phases, and the return electrode(s) need not be in the center of the volume of soil to be heated.

DETAILED DESCRIPTION OF THE INVENTION

The present invention is directed to high efficiency electrode patterns for electrical heating of soils. The invention involves electrode configurations and power phasing arrangements for use in powerline-frequency electrical (joule) heating of soils, such as for the removal of volatile organic compounds by soil heating along with vacuum extraction. Various configurations may be used comprising several heating electrodes around the periphery of a volume of soil to be heated—all connected to one phase of a multi-phase or single-phase power system, and one or more return electrode(s) located inside the volume to be heated and connected to the remaining phases (multi-phase case) or the neutral side of the power source (single-phase). The electrode configuration and power phasing arrangement of the present invention relies only on the judicious placement and power phasing of the heating electrodes, does not require any special hardware, and is more efficient than prior known electrical heating approaches. Thus, powerline-frequency soil heating can be employed at numerous different types of sites, and thus will reduce the required time for cleanup and associated costs. This invention is particularly applicable where soils are contaminated with volatile organic compounds such as gasoline and trichloroethylene (TCE), and can be readily used for cleanup around leaky tanks, for example, without removal of the contaminated soil.

The invention can be understood by reference to the drawings wherein two electrode arrangements for electrically a right-circular cylindrical volume of soil are exemplified. These two arrangements utilize a six-electrode (FIG. 1) and a seven-electrode (FIG. 3) configuration. The FIG. 1 electrode arrangement has been chosen as a reference configuration because it is representative of a family of configurations which can produce progressively more uniform heating patterns inside the circle in the limit of many electrodes, equally spaced, and driven in the correct time-phase.

Figure 1:
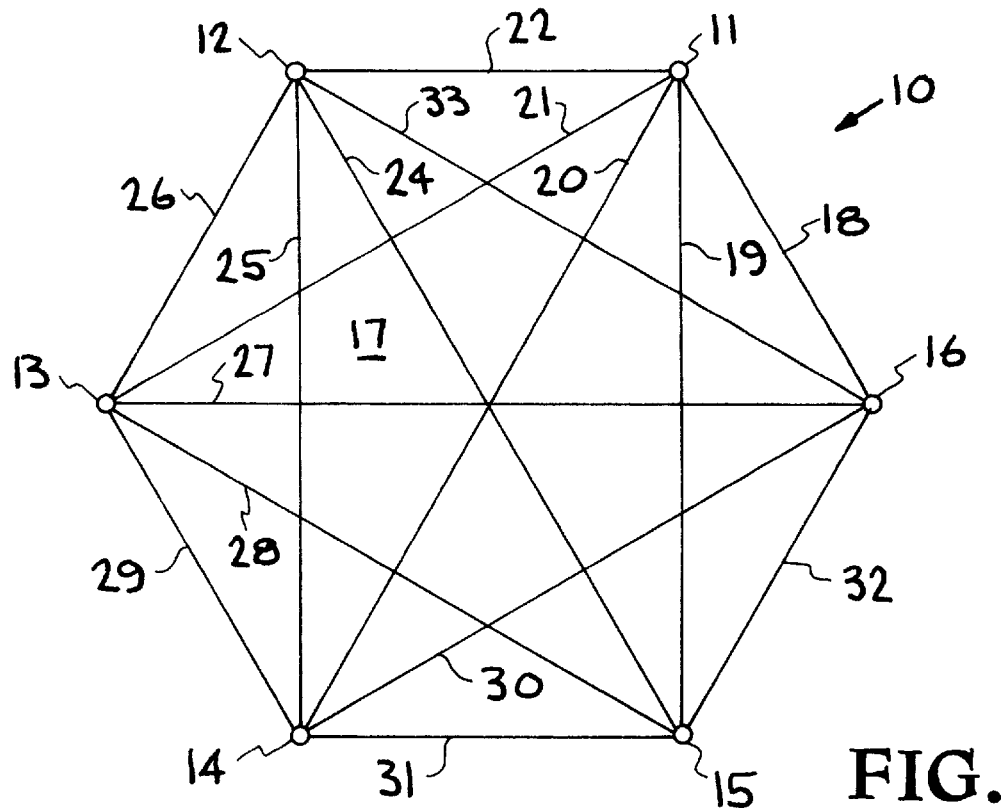
FIG. 1 is a schematic plan view of a 6-electrode, six-phase soil heating arrangement showing paths of direct current flow between electrodes.

FIG. 1 schematically illustrates a six-electrode arrangement, generally indicated at 10, wherein six electrodes 11–16 are equally spaced around a volume of soil 17 and driven by voltages which are sixty degrees apart in time-phase. In FIG. 1, direct paths of electric current flow are shown and starting from electrode 11 are indicated at 18, 19, 20, 21 and 22 flowing to electrodes 16, 15, 14, 13 and 12; at 23, 24, 25 and 26 from electrode 12 flowing to electrodes 16, 15, 14 and 13; at 27, 28 and 29 from electrode 13 to electrodes 16, 15 and 14; at 30 and 31 from electrode 14 flowing to electrodes 16 and 15; and at 32 from electrode 15 to electrode 16. Thus, each electrode 11–16 has a direct current flow path to each of the other five electrodes in the arrangement.

Figure 2:
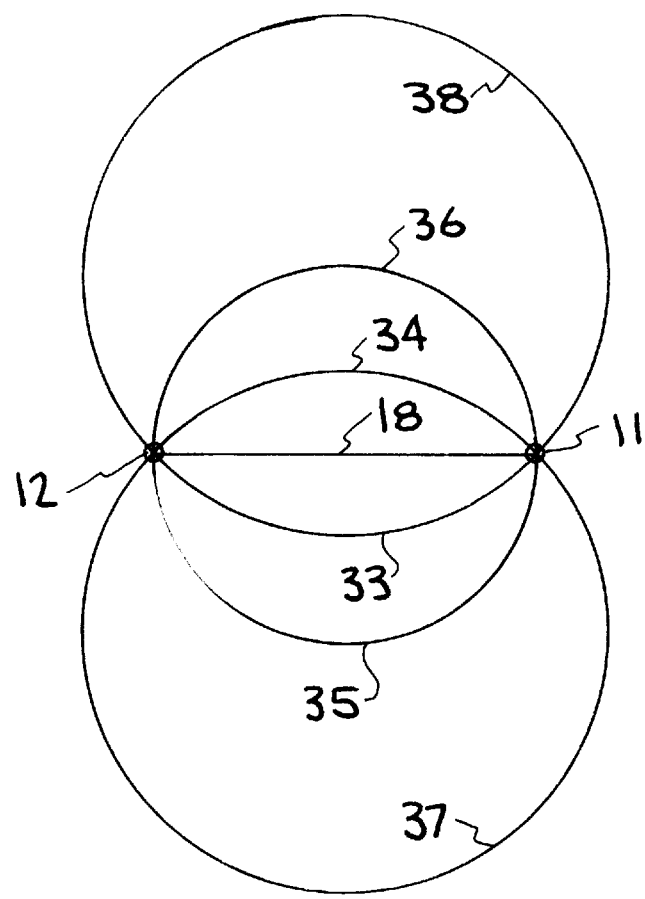
FIG. 2 schematically illustrates the current flow paths and some of the fringing current paths for a current dipole like that of 11–12 in FIG. 1.

While FIG. 1 illustrates the direct paths of electric current flow, there are also fringing currents associated with each of the direct current paths. These fringing currents extend well away from each direct path, and are exemplified in FIG. 2 wherein some of the fringing paths 33, 34, 35, 36, 37 and 38 are shown schematically for a pair of electrodes (a dipole), such as electrodes 11 and 12 in FIG. 1. If this dipole current flow pattern of FIG. 2 is super-imposed on each of the direct current flow paths 18–32 of FIG. 1 (15 direct paths), it is apparent that these fringing currents will result in soil heating well outside of the cylindrical soil volume 17.

Figure 3:
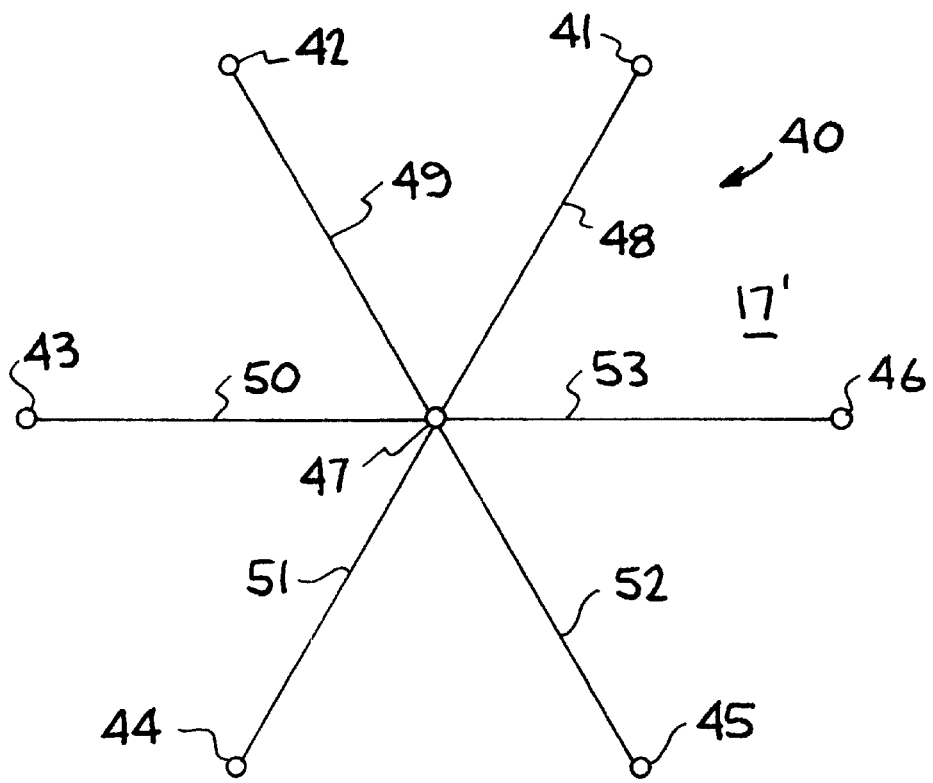
FIG. 3 is a schematic plan view of a seven-electrode, single-phase soil heating arrangement, made in accordance with the invention, showing paths of direct current flow between electrodes.

FIG. 3 schematically illustrates an alternate electrode and power phasing arrangement in accordance with the present invention, and generally indicated at 40, which uses six electrodes 41, 42, 43, 44, 45 and 46 equally spaced around a volume 17', all connected to a single power phase, with a return electrode 47 located at the center and connected to the neutral in a single-phase power system. The direct paths of electric current flow are shown at 48–53 between each of electrodes 41–46 and center electrode 47. If the dipole (fringing) current flow pattern, as shown in FIG. 2, is superimposed on each of the direct current flow paths 48–53 of FIG. 3 (6 direct paths), it is apparent that the fringing currents do not extend nearly as far outside the circular volume 17' as in the FIG. 1 arrangement, and thus the soil heating will be largely confined inside the volume 17'.

The key point to note here is that there is a significant flow of current outside the cylindrical volume 17 in the FIG. 1 arrangement, due to fringing, but not in the FIG. 3 arrangement. This is due for the most part to the flow of current between each of the electrodes on the periphery of the volume 17 which takes place in FIG. 1, but not in FIG. 3. In FIG. 3, the current flow is inward only (toward electrode 47) and not between the peripheral electrodes because all peripheral electrodes are connected to the same electrical phase and thus are at the same electrical potential. Because of the current flow between peripheral electrodes in FIG. 1 there is significant energy deposited outside the volume 17 compared to the FIG. 3 arrangement. For equal power inputs to the arrangements of FIGS. 1 and 3 significantly more energy will be deposited inside the cylindrical volume 17' of FIG. 3 and thus this arrangement is more efficient than that of FIG. 1.

Figure 4:
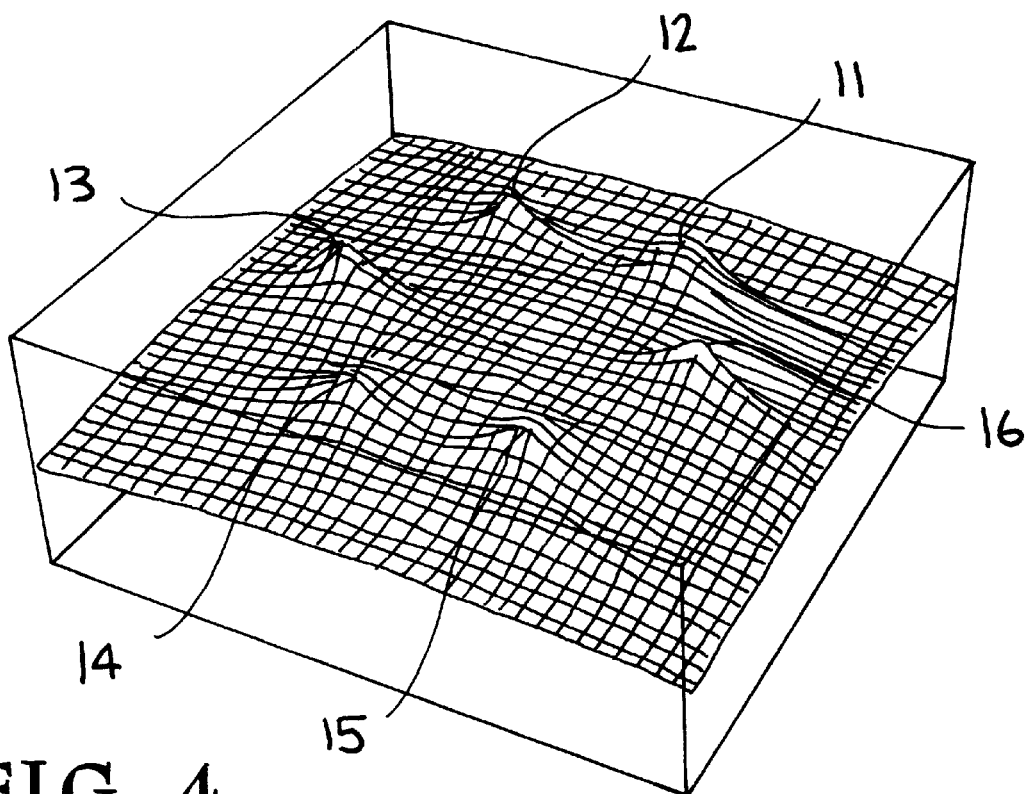
FIG. 4 is a surface plot showing the calculated soil heating rate distribution for the six-electrode arrangement of FIG. 1, driven 60 degrees apart in time-phase.
Figure 5:
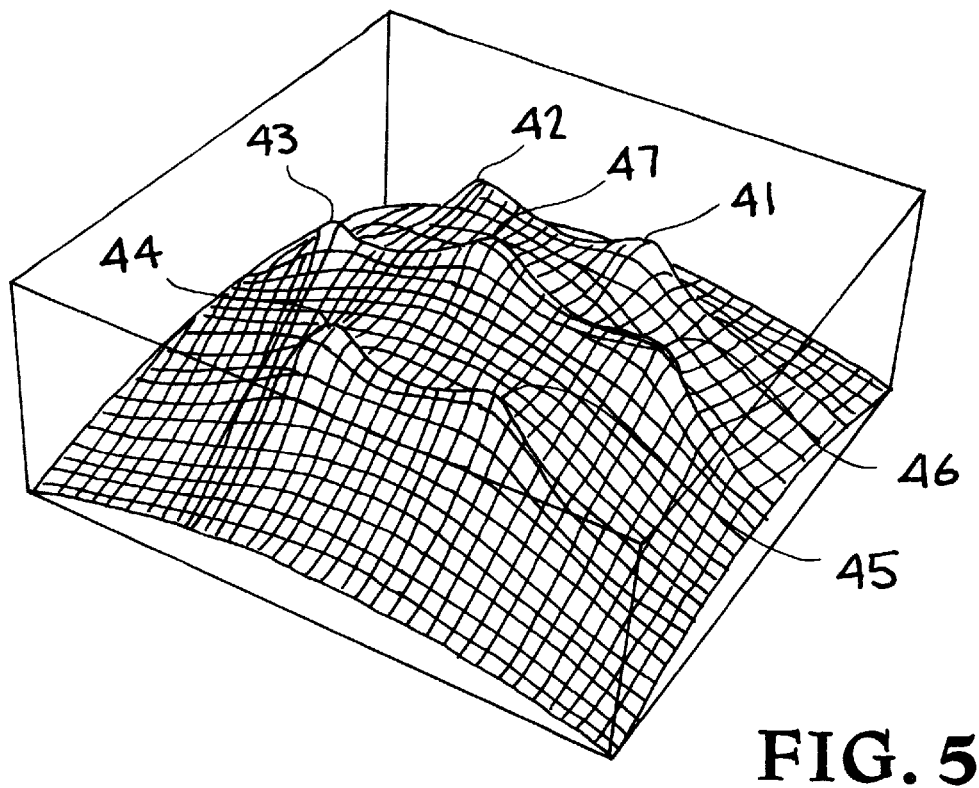
FIG. 5 is a surface plot showing the result for the same volume of soil as in FIG. 4 where the six electrodes around the circumference are driven with a single phase with a single return electrode located at the center, as in the FIG. 3 arrangement.
Figure 6:
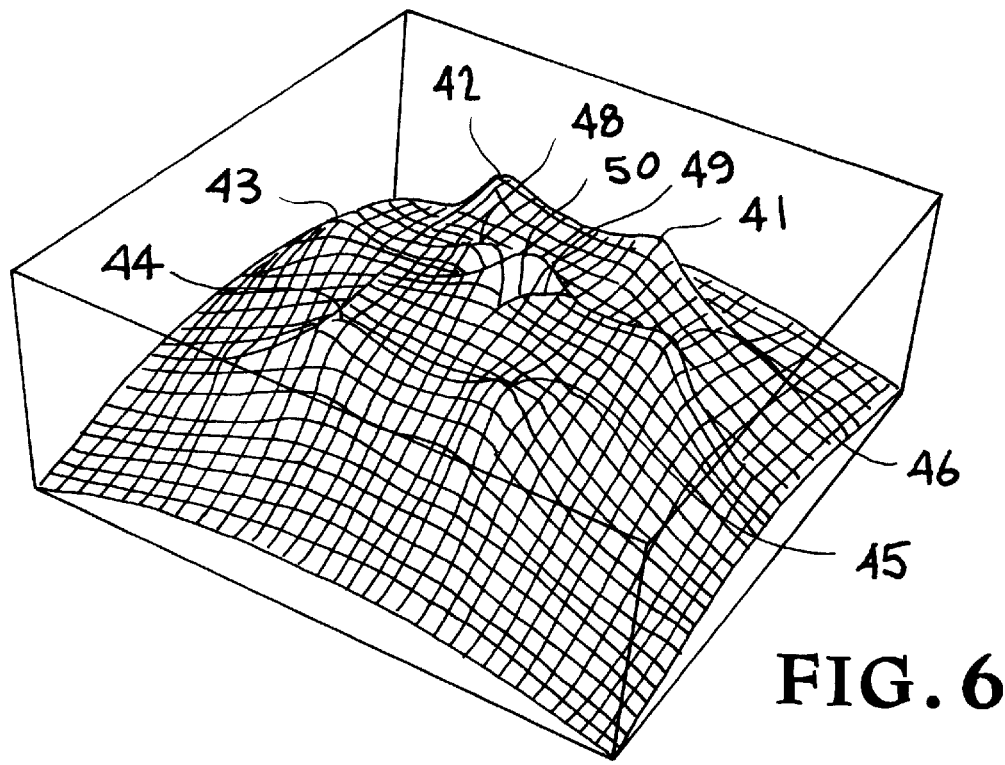
FIG. 6 is a surface plot similar to that of FIG. 5 except that three return electrodes are utilized.

FIGS. 4–6 illustrate surface plots which show the results of calculations which illustrate the benefits to be derived using the electrode arrangements of this invention. FIG. 4 shows the calculated soil heating rate distribution for the FIG. 1 arrangement wherein six electrodes, 11–16, driven 60 degrees apart in time-phase are used, while FIG. 5 shows the result for the same volume of soil where the six electrodes, 41–46, around the circumference are driven with a single phase with a single return electrode 47 placed at the center of the six electrodes. The assumptions used in these calculations are: 1) the calculation is for line-source currents, is 2-dimensional and is analytic, 2) the diameter of the circular pattern is 10.3 m, 3) the soil electrical and thermal properties are homogeneous, 4) the soil resistivity is 10 ohm meters, 5) the soil volumetric heat capacity is $2 \times 10^6$ joule/m$^3$° C., 6) the current injected into each peripheral electrode is 30 Amp/m, and 7) equal power inputs for the FIGS. 1 and 3 arrangements. These results may be scaled for other arrangements by noting that the heating rate is directly proportional to the soil resistivity and the square of the current; and inversely proportional to the volumetric heat capacity and square of the diameter of the cylindrical volume.

The results of arrangements of FIGS. 1 and 3 are shown as 3D surface plots of the logarithm (base 10) of the heating rate for a square 18.5 m on a side which contains the cylindrical volume (17 or 17'). An examination of the plots of FIGS. 4 and 5 and the calculated values from which they are generated reveals that: 1) the heating rates right near the peripheral electrodes are the same in both arrangements, 2) the heating rates are much higher inside the peripheral electrodes of FIG. 5 as compared to FIG. 4 (the average for FIG. 5 is 1.75° C./hr. and for FIG. 4 is 0.26° C./hr.), and 3) the heating rate falls off very rapidly outside the circle of electrodes in FIG. 5 compared to FIG. 4. Thus, the arrangement of FIG. 3 successfully confines the energy inside the circle of electrodes and is approximately 7 times more efficient than the FIG. 1 arrangement.

The invention does not require any specific number of peripheral electrodes, or that they be equally spaced, or a single centrally located return electrode. FIG. 6 illustrates a surface plot similar to FIG. 5 except for splitting the return electrode 47 of FIG. 3 into three (3) electrodes indicated in FIG. 6 at 48, 49 and 50. Here the single return electrode is replaced by three (3) electrodes on a 2 m diameter circle. The reason that the central electrode is split into 3 is so that the current density at each electrode will be lower (one-third the value) than if one return electrode had been used, thus reducing the heating rate near each electrode by a factor of $3^2$ or 9. From a practical point of view this allows the return electrodes to run cooler and thus eases the control problems associated with the electrodes being too hot. The electrode arrangement to produce the surface plot of FIG. 6 would be similar to that of FIG. 3 except that each peripheral heating electrode now has three (3) current return paths to the center of the pattern.

It has thus been shown that the present invention enables high efficiency electrode arrangements and power phasing for use in powerline-frequency electrical heating of soils. The heating electrodes located around a periphery of soil to be heated are all connected to one phase of a multi-phase or single-phase power system and a return electrode or electrodes inside the periphery of the heating electrodes connected to the remaining phases (multi-phase case) or the neutral side of the power source (single-phase case).

While particular embodiments, parameters, etc. have been described and/or illustrated to exemplify and explain the principles of the invention, such are not intended to be limiting. Modifications and changes may become apparent to those skilled in the art and it is intended that the invention be limited only by the scope of the appended claims.

The invention claimed is:

1. Powerline-frequency electrical heating of soil, comprising:

a plurality of spaced electrodes, said electrodes being spaced about a periphery of a volume of soil to be heated, said electrodes being connected to a powerline-frequency power system selected from the group consisting of multiple-phase and single-phase power systems, said spaced electrodes being connected to one phase of said multi-phase or to said single-phase powerline-frequency system, and at least one return electrode located within the periphery of said plurality of spaced electrodes and being connected to the remaining phases of said multi-phase power system or to the neutral side of said single-phase power system.

2. The powerline-frequency electrical heating of soils as set forth in claim 1, wherein each of said electrodes are equally spaced.

3. The powerline-frequency electrical heating of soils as set forth in claim 1, wherein all of said spaced electrodes are connected to a single phase power system, with said at least one additional electrode being connected to a neutral side of said single phase power system.

4. An arrangement for powerline-frequency electrical heating of soils including a plurality of spaced heating electrodes positioned abut the periphery of a volume of soil to be heated;

said plurality of electrodes being adapted to be connected to either a multi-phase or single-phase of a powerline-frequency power system and including at least one return electrode located within said periphery.

5. The arrangement of claim 4, wherein said plurality of spaced heating electrodes are equally spaced.

6. The arrangement of claim 4, wherein said spaced electrodes are all connected to a single phase of said power system with said at least one return electrode being connected to the neutral side of said single phase power system.

7. The arrangement of claim 4, additionally including a plurality of return electrodes within said periphery.

8. The arrangement of claim 7, wherein said spaced heating electrodes are of a number to enable a plurality of current return paths to said plurality of return electrodes.

9. The arrangement of claim 8, wherein said spaced heating electrodes comprises six in number, and wherein said return electrodes comprises three in number.

10. The arrangement of claim 4, wherein said spaced electrodes comprises six electrodes.

11. The arrangement of claim 10, additionally including at least one return electrode located and equally spaced within the six electrodes.

12. The arrangement of claim 10, additionally including a plurality of return electrodes located inside a periphery of said spaced six electrodes.

13. The arrangement of claim 12, wherein said plurality of return electrodes are located within a volume smaller than a volume defined by the spaced six electrodes.

14. A high efficiency electrode pattern and power phasing for electrical heating of soils including:

a plurality of electrodes positioned about a periphery of a volume of soil to be heated and at least one return electrode located within said periphery;

said plurality of electrodes being connected to a powerline-frequency power system, wherein said electrodes are either connected to a phase of a multi-phase powerline-frequency power system or to a phase of a single-phase powerline-frequency power system.

15. The electrode pattern of claim 14, wherein said plurality of electrodes are equally spaced.

16. The electrode pattern of claim 14, wherein said plurality of electrodes are all connected to a single-phase powerline-frequency power system, with said at least one return electrode connected to a neutral side of the single-phase power system.

17. The electrode pattern of claim 14, wherein said at least one return electrode is located in the center of said plurality of spaced electrodes.

18. The electrode pattern of claim 14, wherein said at least one return electrode comprises a plurality of return electrodes located inside the periphery of said plurality of electrodes.

19. The electrode pattern of claim 18, wherein said plurality of electrodes are of a number so that each has a plurality of current return paths to said return electrodes.

20. The electrode pattern of claim 19, wherein said plurality of electrodes are six in number, and wherein said plurality of return electrodes are three in number.

* * * * *